UNITED STATES PATENT OFFICE.

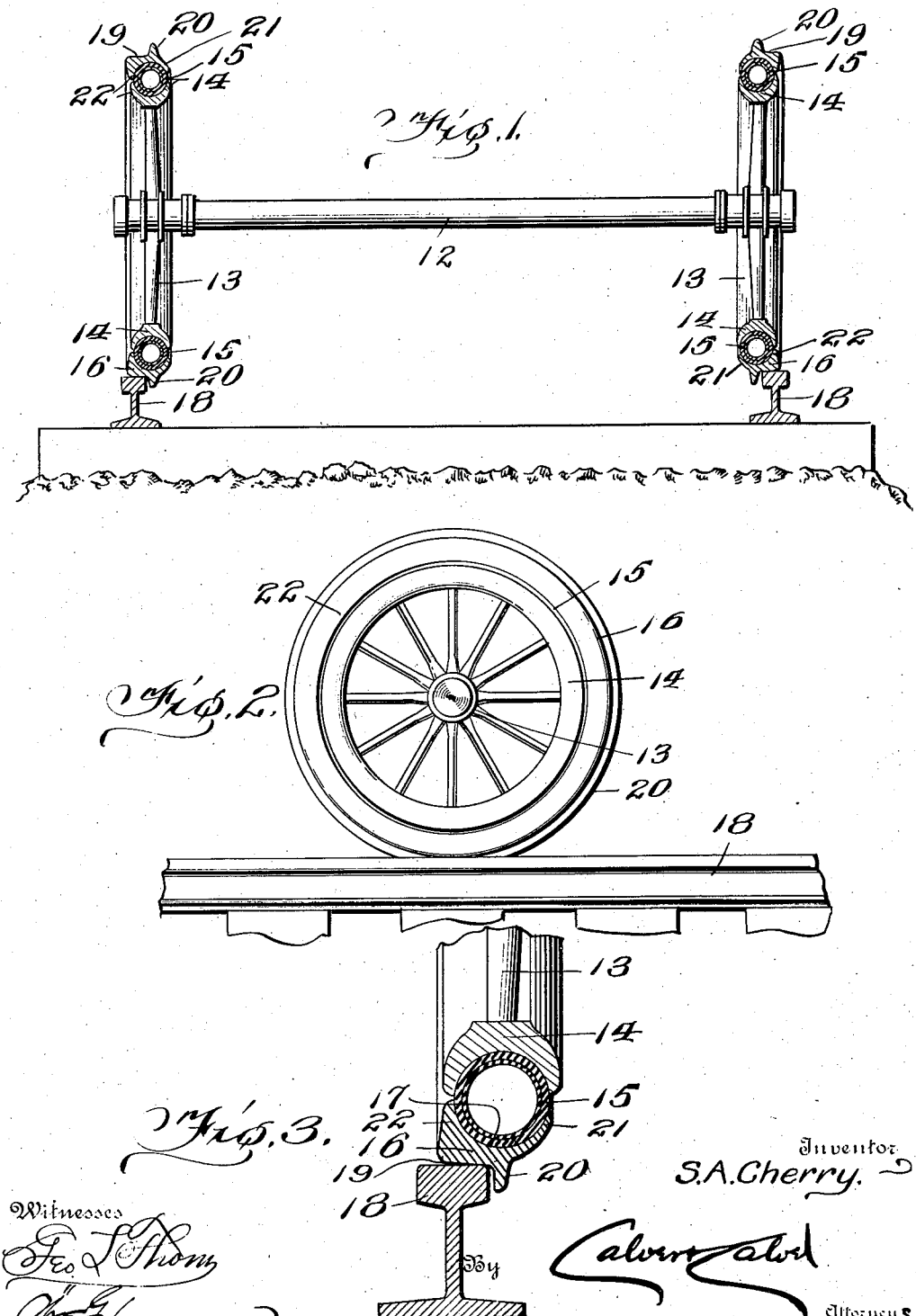

SPENCER A. CHERRY, OF NASHVILLE, TENNESSEE.

ATTACHMENT FOR VEHICLE-WHEELS.

1,028,676.

Specification of Letters Patent.

Patented June 4, 1912.

Application filed May 14, 1910. Serial No. 561,366.

*To all whom it may concern:*

Be it known that I, SPENCER A. CHERRY, a citizen of the United States, residing at Nashville, in the county of Davidson and State of Tennessee, have invented or discovered certain new and useful Improvements in Attachments for Vehicle-Wheels, of which the following is a specification, reference being had therein to the accompanying drawings.

This invention relates to vehicle wheels, being more particularly applicable to the pneumatic tired wheels of automobiles, although not necessarily limited thereto, and has for its object to provide means whereby a vehicle wheel of ordinary construction may be adapted for use upon the rails of a railroad track.

The more particular object of the invention is to provide a wheel attachment for so converting an automobile wheel as to enable a railroad official, or other person to make a trip of any desired distance over railroad track in his own automobile, and thereafter to leave the railroad and go as far as he pleases over ordinary roads.

A further object of the invention is to provide an attachment of the character referred to of such construction that the change from rail to highway and vice versa can be made very quickly and by the mere deflation and reinflation of the pneumatic tires and without the necessity of removing screws, bolts, or other attaching means.

Other objects of the invention, together with means whereby the same may be carried into effect, will best be understood from the following description of one form or embodiment thereof illustrated in the accompanying drawings. It is to be understood, however, that the construction described and shown has been chosen for illustrative purposes merely, and that many changes may be made therein without departing from the spirit and scope of the invention.

In said drawings—Figure 1 is a vertical section of an axle and a pair of wheels having my invention applied thereto in position on a railroad track; Fig. 2 is a side elevation of one of said wheels, and Fig. 3 is a detail vertical section through the tire and rim.

In the construction shown 12 denotes the axle of the automobile or other vehicle equipped with wheels 13, 13 which, for purposes of illustration, may be either the front or steering wheels or the rear or driving wheels, said wheels being provided with the usual rims 14 and tires 15.

The attachment forming the subject of this invention comprises an auxiliary tread member in the form of a band 16, preferably of steel or other suitable metal, and also preferably constructed as a single, continuous, unitary and solid member, of a suitable size and form to surround the periphery of the wheel or of the tire attached thereto. The band 16 is arranged for detachable connection with the wheel or tire and to this end is preferably provided with a curved inner surface 17 adapted substantially to fit the peripheral or tread surface of the tire, whereby when the tire is deflated the band 16 may be readily slipped thereover laterally, and afterward secured in place by the subsequent inflation of the tire.

The outer or tread surface of the band 16 is constructed to fit or coöperate with a railroad rail 18 beneath the wheel, and to this end is formed with a substantially cylindrical portion 19 adapted to engage the top of the rail and with an annular flange 20 adapted to engage the side of said rail. The inner surface 17 of the band 16 preferably terminates in two side portions 21 and 22 respectively, extended inwardly toward the hub of the wheel and adapted to engage the tire 15 laterally, the portion 21 being of a less width relatively than the portion 22, whereby said portion may be slipped laterally over the tire when deflated. With the band 16 in place, however, the relatively wider side portion 22 will prevent further relative lateral movement of the tire and band. The bands 16 of the two wheels of a pair will be slipped into place from the outer side and will therefore be oppositely arranged, as indicated in Fig. 1. In the construction shown the side portion 22 engages the outer side or lateral face of the tire 15 while the flange 20 engages the inner side of the rail 18. These projecting portions 22 and 20 therefore being oppositely arranged and engaging the tire and rail at opposite sides will maintain the wheel in position on the rail. The two bands of each pair of wheels being oppositely arranged will prevent the wheels from leaving the rails in either direction.

The standard gage of practically all rail-roads as now built, particularly in the United States, is 56½ inches, measured between the interior faces of the wheel flanges. Automobiles as now constructed are usually 56 inches from center to center of the wheels. It will be observed that in the construction herein shown the flanges 20 are located substantially in the same vertical plane with the centers of the tires. By this construction the attachment herein shown enables an automobile of standard construction to be operated upon a railroad of standard gage, the solid, integral construction of the bands 16 enabling these bands to resist the somewhat eccentric stresses produced by this arrangement.

Having thus described my invention I claim and desire to secure by Letters Patent:—

1. An attachment for a vehicle wheel comprising an annular, substantially rigid band adapted to surround the tread of a pneumatic tire and to be held in place thereon by the inflation of said tire, said band having rigid side portions adapted to engage said tire laterally, one of said side portions being of a relatively less width to permit said band to be slipped laterally over said tire when deflated, and the other of said side portions being of a relatively greater width and being extended to a position substantially adjacent the rim of the wheel to prevent relative lateral movement of said tire and band, said band having an annular flange on its surface, said last-named side portion and said flange being arranged respectively to engage at opposite sides said tire and a railroad rail beneath said wheel.

2. An attachment for a vehicle wheel comprising an annular, substantially rigid band adapted to surround the tread of a pneumatic tire and to be held in place thereon by the inflation of said tire, said band having rigid side portions adapted to engage said tire laterally, one of said side portions being of a relatively less width to permit said band to be slipped laterally over said tire when deflated, and the other of said side portions being of a relatively greater width and being extended to a position substantially adjacent the rim of the wheel to prevent relative lateral movement of said tire and band, said band having an annular flange on its outer surface located in substantially the same vertical plane with the center of said tire, said last-named side portion and said flange being arranged respectively to engage at opposite sides said tire and a railroad rail beneath said wheel.

I testimony whereof I affix my signature, in presence of two witnesses.

SPENCER A. CHERRY.

Witnesses:
J. A. ALTHAUSER,
JOHN WILKES.